United States Patent
Flaherty

(10) Patent No.: US 10,035,467 B2
(45) Date of Patent: Jul. 31, 2018

(54) SPECIFIED CLAMP FORCE INDUCING TRANSMISSION FOR A BICYCLE FORK MOUNT

(71) Applicant: Thule Sweden AB, Hillerstorp (SE)

(72) Inventor: Joseph Flaherty, Prospect, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/427,292

(22) PCT Filed: Sep. 10, 2013

(86) PCT No.: PCT/US2013/059075
§ 371 (c)(1),
(2) Date: Mar. 10, 2015

(87) PCT Pub. No.: WO2014/043132
PCT Pub. Date: Mar. 20, 2014

(65) Prior Publication Data
US 2015/0224939 A1  Aug. 13, 2015

Related U.S. Application Data

(60) Provisional application No. 61/699,757, filed on Sep. 11, 2012.

(51) Int. Cl.
*B60R 9/048* (2006.01)
*B60R 9/10* (2006.01)
(Continued)

(52) U.S. Cl.
CPC ............. *B60R 9/048* (2013.01); *B60R 9/10* (2013.01); *F16H 25/24* (2013.01); *G05G 1/08* (2013.01);
(Continued)

(58) Field of Classification Search
CPC .. B60R 9/048; B60R 9/10; G01L 5/24; B25B 23/141; B25B 23/1427; Y10S 224/924
(Continued)

(56) References Cited

U.S. PATENT DOCUMENTS 3,085,517 A * 4/1963 Smith .................... B61D 7/20
105/282.3
4,346,633 A * 8/1982 Rendl .................. B25B 13/466
464/43

(Continued)

FOREIGN PATENT DOCUMENTS

EP    1 142 760    10/2001

OTHER PUBLICATIONS

International Search Report and Written Opinion of the International Searching Authority for International Appl. No. PCT/US2013/059075, European Patent Office, Rijswijk, Netherlands, dated Nov. 8, 2013, 14 pages.

*Primary Examiner* — Scott McNurlen
(74) *Attorney, Agent, or Firm* — Sterne, Kessler, Goldstein & Fox P.L.L.C.

(57) ABSTRACT

A drive mechanism is presented for tightening a skewer of a bicycle fork anchor upon a prong of a bicycle fork by delivering a predetermined drive-force to the skewer. The drive mechanism draws a head of the skewer against the prong thereby pinch-securing the bicycle fork to the bicycle fork anchor. The drive mechanism can include a manually operable actuator and a transmission. The manually operable actuator can be coupled to the transmission. The transmission can include a slip mechanism that only transmits driving forces to the skewer of the bicycle fork anchor that are less than the predetermined drive-force.

28 Claims, 10 Drawing Sheets

(51) Int. Cl.
  *F16H 25/24* (2006.01)
  *G05G 1/08* (2006.01)
  *F16B 31/02* (2006.01)
(52) U.S. Cl.
  CPC .......... *B62K 2206/00* (2013.01); *F16B 31/02* (2013.01); *Y10S 224/924* (2013.01); *Y10T 74/20396* (2015.01)
(58) Field of Classification Search
  USPC .............. 411/6–7, 12; 81/473, 475; 224/924
  See application file for complete search history.

(56) References Cited

U.S. PATENT DOCUMENTS

| | | | | |
|---|---|---|---|---|
| 4,692,075 | A * | 9/1987 | Metz | F16B 31/02 411/105 |
| 5,190,390 | A * | 3/1993 | Ming-Tai | B62B 9/14 16/334 |
| 5,598,959 | A * | 2/1997 | Lorensen | B60R 9/045 224/315 |
| 5,875,947 | A | 3/1999 | Noel et al. | |
| 5,950,509 | A * | 9/1999 | Doong | B25B 21/00 81/473 |
| 6,070,774 | A | 6/2000 | Rak et al. | |
| 6,082,941 | A * | 7/2000 | Dupont | F16B 31/02 411/7 |
| 6,364,688 | B1 * | 4/2002 | Fraley, II | H01R 13/639 411/353 |
| 6,487,943 | B1 * | 12/2002 | Jansson | B25B 15/02 81/467 |
| 7,013,769 | B2 * | 3/2006 | Chen | B25B 15/02 81/467 |
| 8,065,940 | B2 * | 11/2011 | Wilson | B25B 13/06 81/467 |
| 2004/0060952 | A1 * | 4/2004 | Perlman | B43K 23/04 224/269 |
| 2009/0102276 | A1 * | 4/2009 | Mercat | B62K 25/02 301/124.2 |
| 2010/0192704 | A1 * | 8/2010 | Flaherty | B60R 9/058 73/862.21 |

* cited by examiner

SPECIFIED CLAMP FORCE INDUCING TRANSMISSION FOR A BICYCLE FORK MOUNT

FIELD

The present disclosure relates generally to bicycle carriers. More specifically, embodiments within this disclosure relate to a mechanism configured to couple the bicycle fork to the carrier.

BACKGROUND

Safely and conveniently transporting sports equipment is a concern for many sports enthusiasts. For example, bicycles can be carried on bicycle carriers. Typically, the carrier can be a hitch mounted carrier, a carrier configured to be coupled to the rear of the vehicle, or a carrier configured to be coupled to a rack on the roof of the vehicle.

BRIEF DESCRIPTION OF THE DRAWINGS

Implementations of the present application will now be described, by way of example only, with reference to the attached figures, wherein.

DETAILED DESCRIPTION

Figure 1:
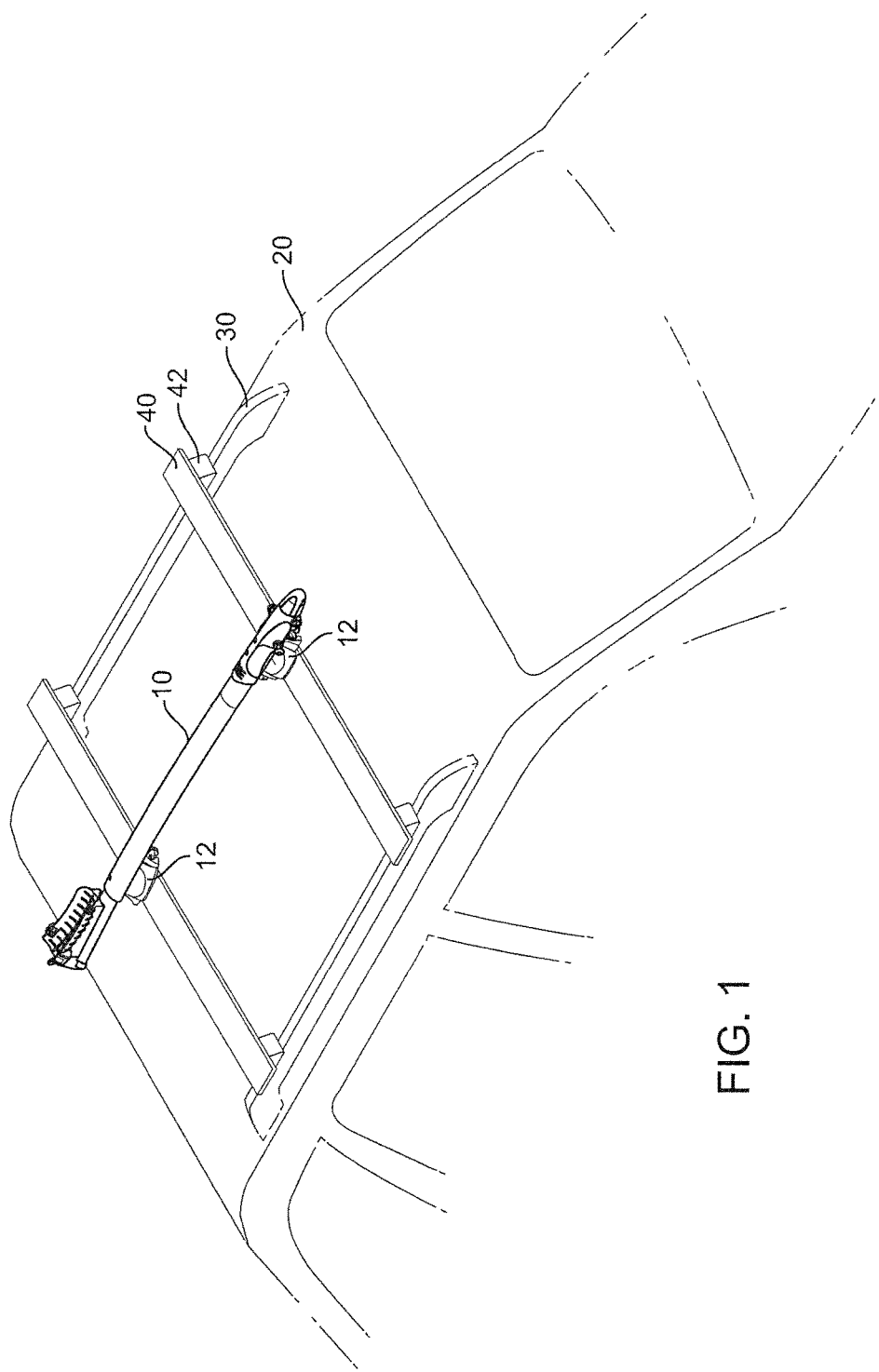
FIG. 1 is a perspective view of a bicycle carrier, in accordance with an exemplary embodiment, mounted to an exemplarily roof rack of a vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood that the implementations described herein can be practiced without these specific details. In other instances, methods, procedures and components have not been described in detail so as not to obscure the related relevant function being described. Also, the description is not to be considered as limiting the scope of the implementations described herein.

The present disclosure concerns bicycle fork anchor configured to be releasably coupled to a bicycle fork. The bicycle fork anchor as presented herein can be used with a roof mounted bicycle rack, a hitch mounted bicycle rack or a specialized rack, for example in the bed of a pickup or on a trailer. The bicycle fork anchor can include a skewer. The bicycle fork anchor can further include a drive mechanism. The drive mechanism can tighten the skewer upon a prong of a bicycle fork. The present disclosure includes a drive mechanism that can be configured to deliver a predetermined drive-force to the skewer which draws a head of the skewer against the prong thereby pinch-securing the bicycle fork to the bicycle fork anchor. When the drive mechanism delivers a predetermined drive-force to the skewer, the drive-mechanism can be further configured to notify the operator that the predetermined drive-force has been delivered. For example, the drive mechanism can make a clicking sound. In another example, an indicator can be included on the drive mechanism. The indicator can be a pointer and a scale indicating that full tightness has been achieved. In another embodiment, the indicator can be a positive indicator such as a color changing indicator. Other indicators are considered within the scope of this disclosure which provides an indication to the operator that the predetermined tightness has been achieved. Additionally, the drive mechanism can include a manually operable actuator and a transmission. The manually operable actuator can be coupled to the transmission which can be drivingly coupled the skewer of the bicycle fork anchor. The transmission can include a slip mechanism that only transmits driving forces to the skewer of the bicycle fork anchor that are less than the predetermined drive-force.

Referring to FIG. 1, an example of a bicycle carrier 10 is illustrated. The bicycle carrier 10 can be coupled to the vehicle 20 through one or more rack components. As illustrated, the bicycle carrier 10 is coupled to a cross member 40 that runs the width of the vehicle 20 by a pair of coupling feet 12. The coupling feet 12 can have various shapes and configurations depending on the cross member 40 and bicycle carrier 10. The cross member 40 is in turn coupled to the roof rack 30 by cross member rack feet 42. The cross member rack feet 42 can have various sizes and configurations to allow for the coupling of the cross member 40 to the roof rack 30. In the illustrated embodiment, the roof rack 30 is coupled directly to the vehicle 20. In other embodiments, the cross member 40 can be formed together with the roof rack 30 so that no cross member rack feet 42 are required. In some embodiments, the cross member 40 can be fixedly coupled to the roof rack 30 with fasteners.

Figure 2:
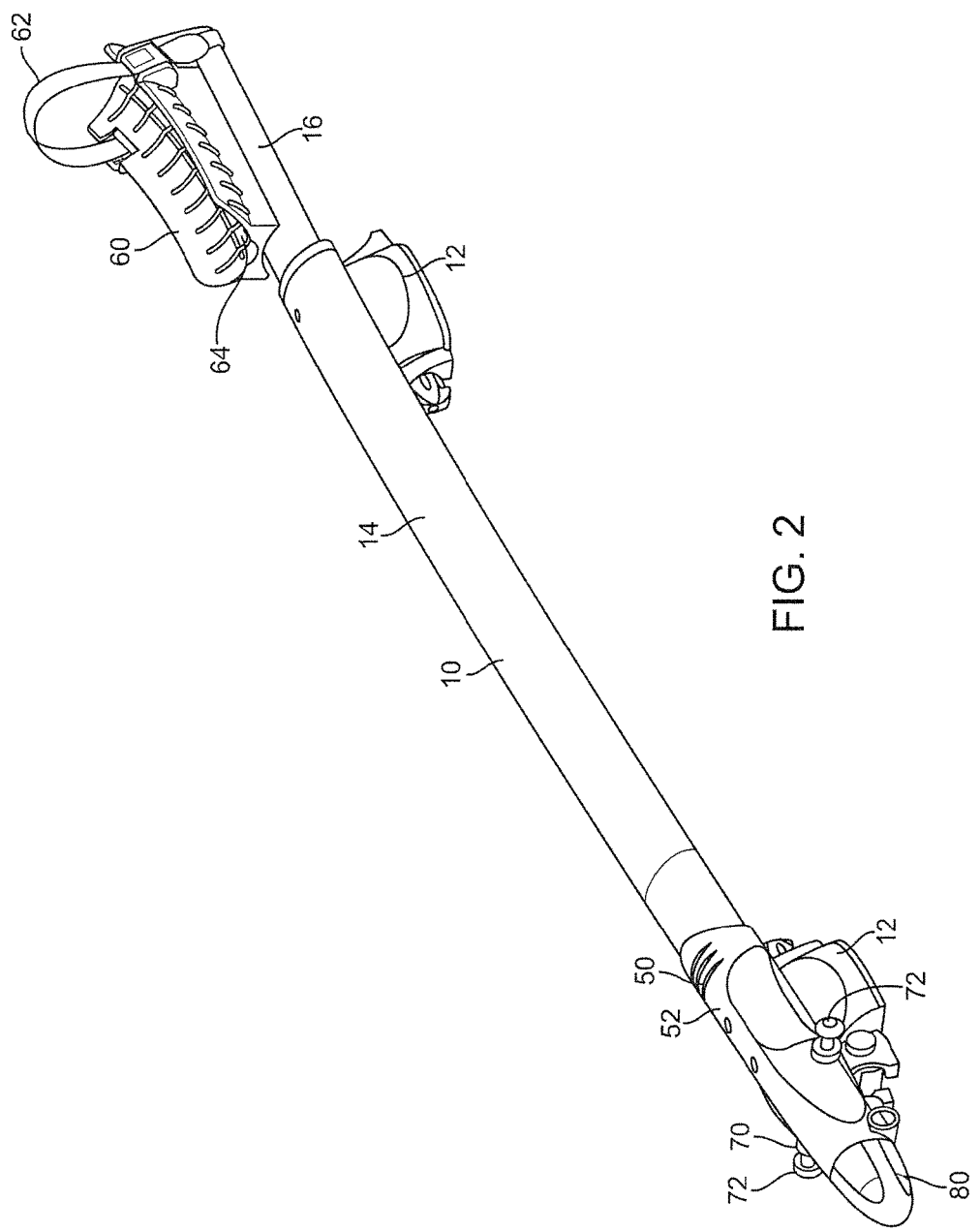
FIG. 2 is an exemplary perspective view of the bicycle carrier, in accordance with an exemplary embodiment, of FIG. 1.

FIG. 2 illustrates a more detailed example of the bicycle carrier 10 that is illustrated in FIG. 1. The bicycle carrier 10 can be coupled to coupling feet 12. The bicycle carrier 10 can also include bicycle fork anchor 50 and a rear wheel tray 60. The rear wheel tray 60 includes a wheel receiving portion 64 and retaining strap 62. The wheel receiving portion 64 can be configured based on the type of bicycle to be mounted thereon. For example, in at least one embodiment, different wheel trays 60 can be available for mountain bicycles, road bicycles, or speed trial bicycles, among other types of wheels and frames. In yet other embodiments, such as the one illustrated, the bicycle tray 60 can include a wheel receiving portion 64 that can accommodate two or more types of bicycle tires or rims. The strap 62 as illustrated is an adjustable strap. As illustrated, the bicycle carrier 10 includes a main tube 14 and an extendable tube 16. The extendable tube 16 allows for accommodating different bicycle wheel bases while providing a compact storable size.

The bicycle fork anchor 50 includes an anchor body 52 which can protect the internal components from damage and/or provide a streamlined shape. The bicycle fork anchor 50 also includes a skewer 70. The skewer 70 is configured to releasably couple a bicycle fork to the bicycle fork anchor 50. The skewer 70 has two heads 72. The movement of the skewer heads 72 can be controlled by rotating the manually operable actuator 80. The manually operable actuator 80 can be substantially in the shape of a cone, for example see FIG. 2. In other embodiments, the manually operable actuator 80 can take other forms such as a rotatable knob, a rotatable handle, a lever, a pin or other component that can be used to adjust the position of the heads 72 of the skewer 70.

Figure 3:
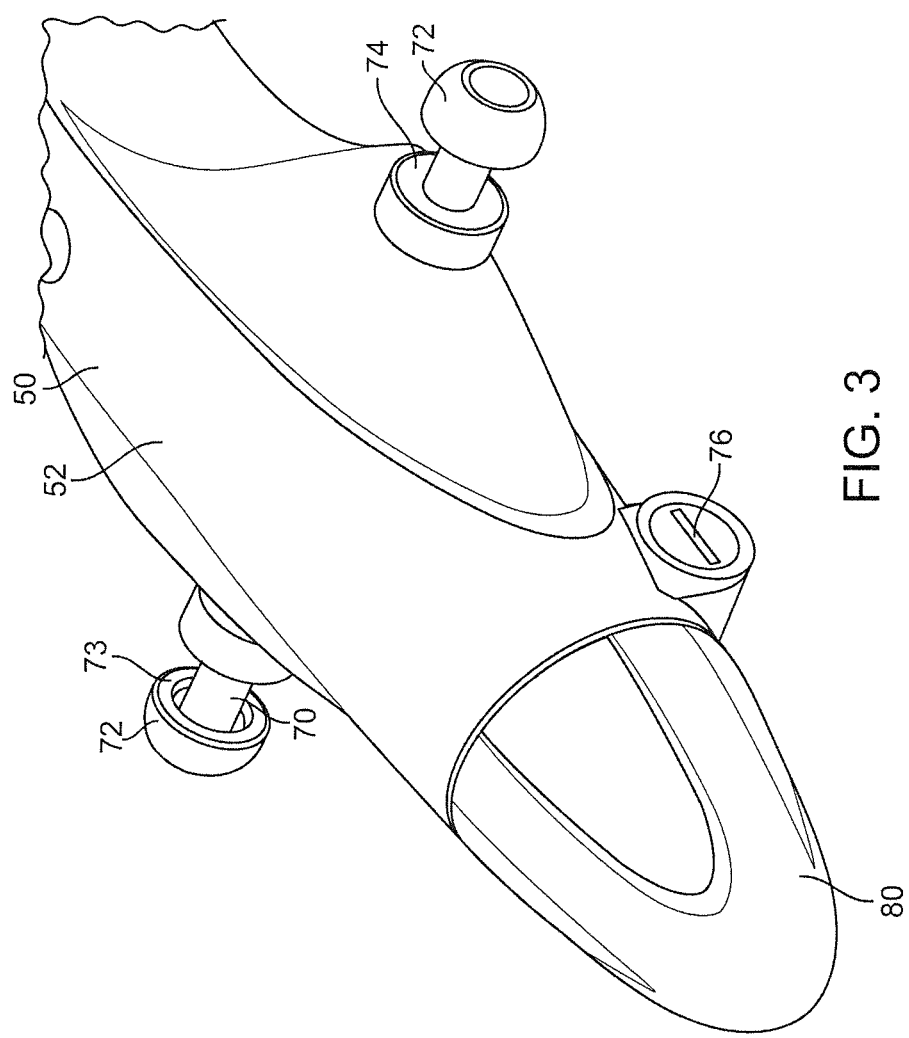
FIG. 3 is a perspective view of a bicycle fork anchor of the bicycle carrier, in accordance with an exemplary embodiment, of FIG. 2.

FIG. 3 illustrates a perspective view of the bicycle fork anchor 50 with a bicycle fork secured thereto. In order to secure the bicycle fork to the bicycle fork anchor 50, the manually operable actuator 80 is rotated. As the manually operable actuator 80 is rotated the heads 72 of the skewer 70 move inwards. As the head 72 moves inwards, the inside portion 73 of the head 72 comes into contact with an outside portion of the bicycle fork. The inside portion of the bicycle fork also comes into contact with the prong abutment 74 of the bicycle fork anchor. Thus, the bicycle fork is pinch-secured to the bicycle fork anchor 50. Once the bicycle fork is secured to the bicycle fork anchor 50, the bicycle fork anchor 50 can be locked by lock 76. The lock 76 prevents the rotation of the manually operable actuator 80, thereby locking the bicycle fork to the bicycle fork anchor 50. In other embodiments, other types of locking devices can be implemented to prevent removal of the bicycle fork from the bicycle fork anchor 50. The bicycle fork can be removed from the bicycle fork anchor 50 by releasing the lock 76 if it is engaged and rotating the manually operable actuator 80 until the bicycle fork is released by the skewer 70. While the manually operable actuator has been described as being rotated, the present disclosure contemplates other configurations of the manually operable actuator 80 that do not involve rotation.

Figure 4:
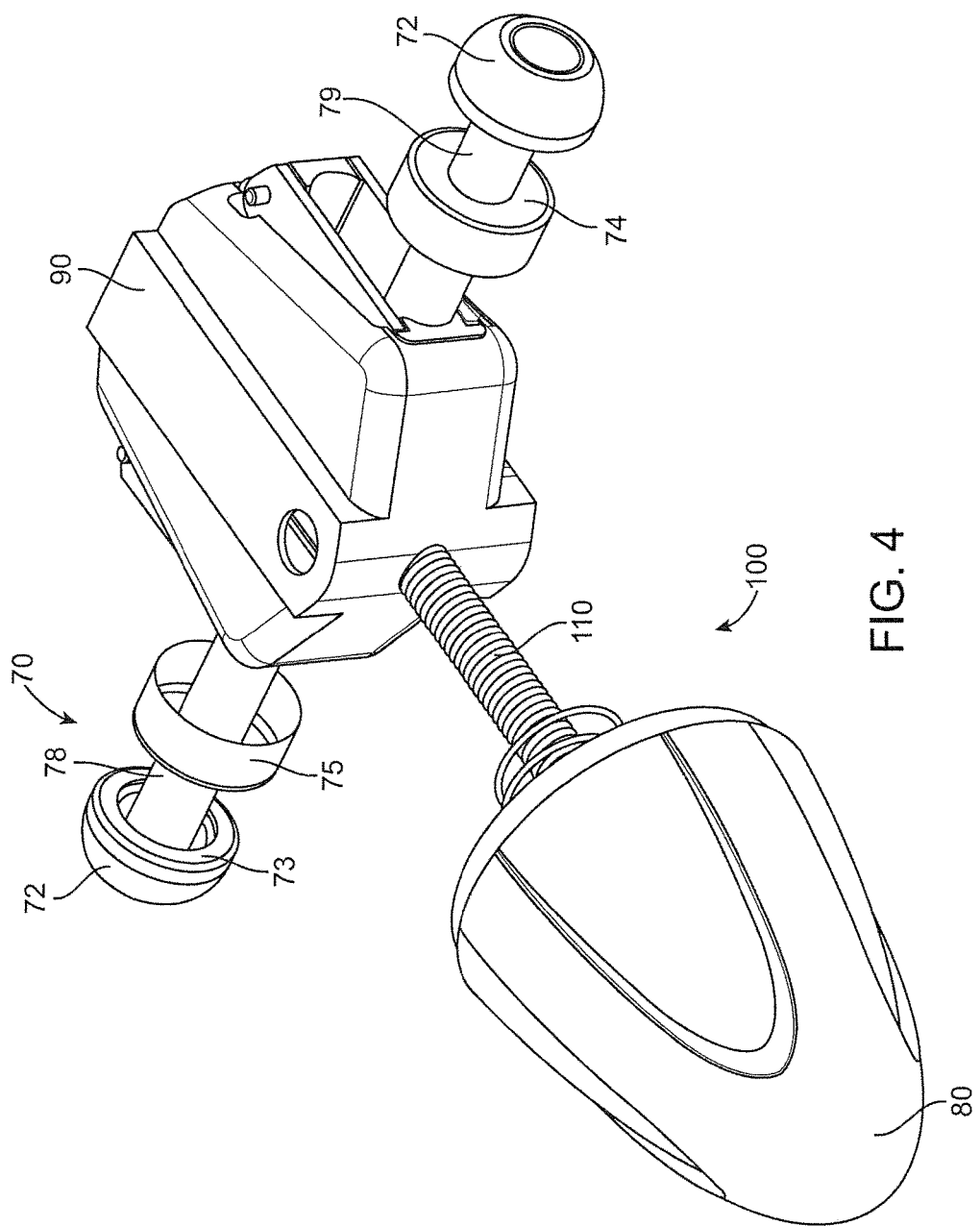
FIG. 4 is a perspective view of the bicycle fork anchor, in accordance with an exemplary embodiment, of FIG. 3 having the body cover removed so that the skewers, skewer contraction device, and manually operable actuator are more clearly illustrated.

FIG. 4 illustrates the bicycle fork anchor 50 of FIG. 3 with the anchor body 52 removed to expose the components. A drive mechanism 100 is illustrated that is configured to tighten the skewer 70 of the bicycle fork anchor 50. The skewer 70 can be tightened upon a prong of a bicycle fork, for example as shown in FIG. 3. The drive mechanism 100 includes a manually operable actuator 80. The manually operable actuator 80 as includes an operator graspable, rotatory nose-cone. This rotatory nose-cone is positioned at the front of the bicycle fork anchor 50. See FIG. 3. When the manually operable actuator 80 is in the form of a rotary nose-cone, the shape provides for an aerodynamic leading portion. In other embodiments, the manually operable actuator 80 can be in the form of a knob or other manually operable actuator as described above. As illustrated, the manually operable actuator 80 houses a transmission (shown in at least FIG. 5). The transmission can be coupled to a drive shaft 110. The drive shaft 110 as illustrated includes a threaded portion 111. The threaded portion 111 can be configured to be engaged with a skewer adjustment mechanism 90. The skewer adjustment mechanism 90 controls the movement of the skewer 70 and/or skewer heads 72.

As illustrated, the skewer 70 can include two skewer heads 72. The skewer heads 72 can have an inside portion 73. Fork stop portions 75 which have inner portions 74 which provide a face upon which can engage the bicycle fork prong. As illustrated, the skewer 70 can include a left shaft 78 and a right shaft 79. In at least one embodiment, the left shaft 78 and the right shaft 79 can be configured to move independently inwardly thereby causing the heads 72 to move independent of one another. When the left shaft 78 and the right shaft 79 are configured for independent movement, their respective movement can be controlled by the skewer adjustment mechanism 90. In at least one embodiment, the skewer adjustment mechanism 90 is configured to apply equal pressure to the respective prong of the bicycle fork. In other embodiments, the left shaft 78 and right shaft 79 move in unison. When the skewer adjustment mechanism 90 is implemented to provide for equal pressure, the securement of the bicycle fork is enhanced because if unequal pressure is supplied on different sides of the bicycle fork, the operator may believe the bicycle is secure even though one side is not secure.

Figure 5:
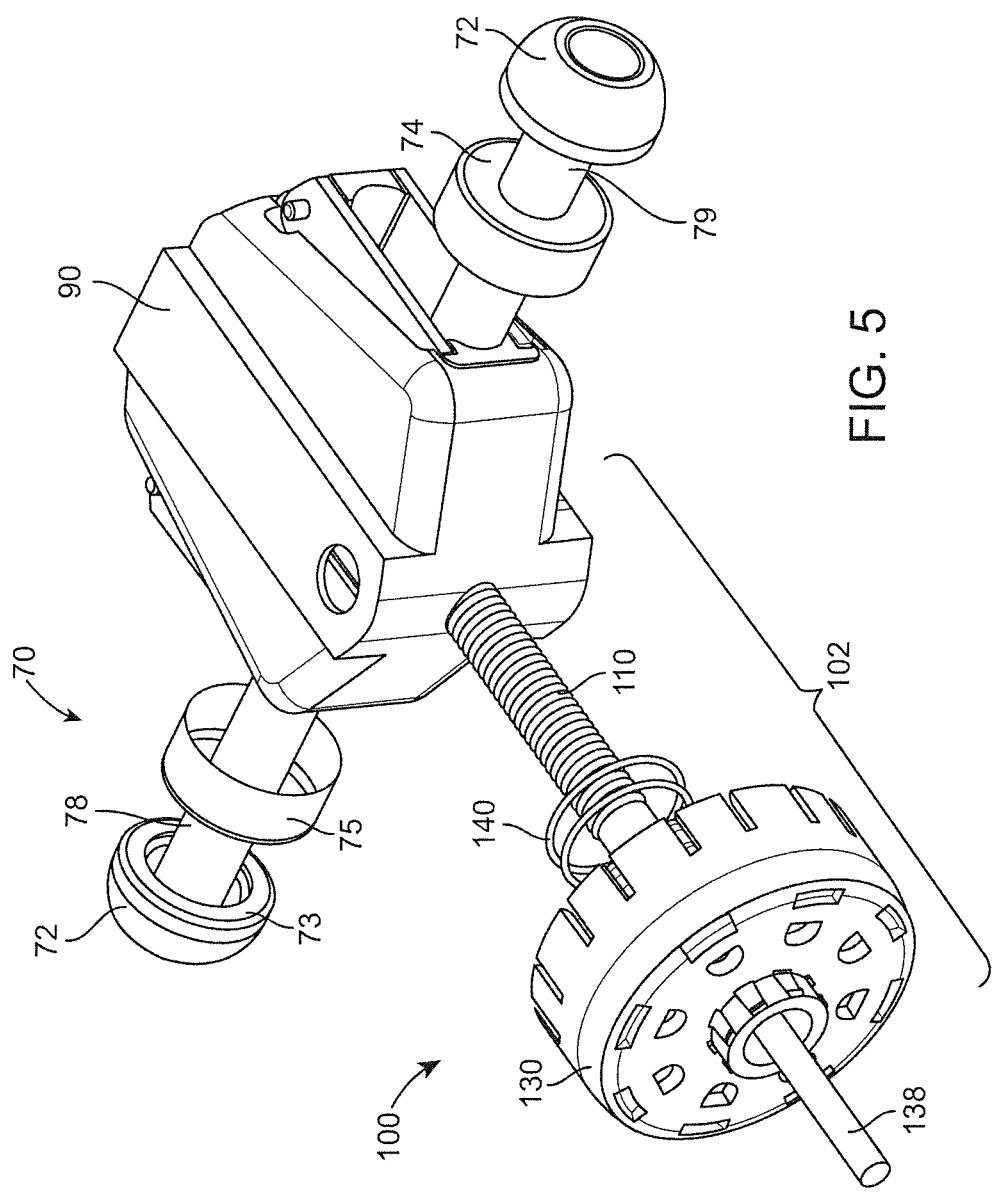
FIG. 5 is a perspective view of the bicycle fork anchor, in accordance with an exemplary embodiment, of FIG. 4, wherein the manually operable actuator has been removed for illustration.

FIG. 5 illustrates the example bicycle fork anchor 50 of FIG. 4, wherein the manually operable actuator has been removed. As illustrated the transmission 102 is exposed. The transmission 102 can optionally include a retaining member 130 and a biasing member 140. The biasing member 140 as illustrated is a spring, specifically a coil spring. In other embodiments, the biasing member 140 can take other forms. For example the biasing member can be a leaf spring, an elastomeric material, an elastomeric-like material, a sponge, or sponge-like material. In other embodiments, no biasing member 140 is included. If a biasing member 140 is included, the amount of predetermined drive-force that the transmission 102 is capable of transmitting from the manually operable actuator 80 to the skewer 70 can be increased.

Also, as illustrated, a retaining member 130 is included. The retaining member 130 can be secured to the manually operable actuator by a fastener 138. In other embodiments, the retaining member 130 can be integrally formed with the manually operable actuator 80. For example, when the manually operable actuator 80 is formed from a plastic, the retaining member 130 can be molded together with the manually operable actuator 80. Likewise, the retaining member 130 can be cast together with the manually operable actuator 80 out of metal. Additionally, the retaining member 130 can be separately formed and later bonded through welding (plastic or metallic) or glued to the manually operable actuator 80. In yet other embodiments, the drive mechanism 100 according to the present disclosure can be constructed without a retaining member. For example, the manually operable actuator 80 can be sized to appropriately constrain the movement of the slip mechanism if necessary.

The retaining member 130 can be part of the slip mechanism 104 (see FIG. 6) and house components of the slip mechanism. The slip mechanism 104 can be configured to only transmit driving forces to the skewer 70 of the bicycle fork anchor 50 that are less than the predetermined drive-force.

Figure 6:
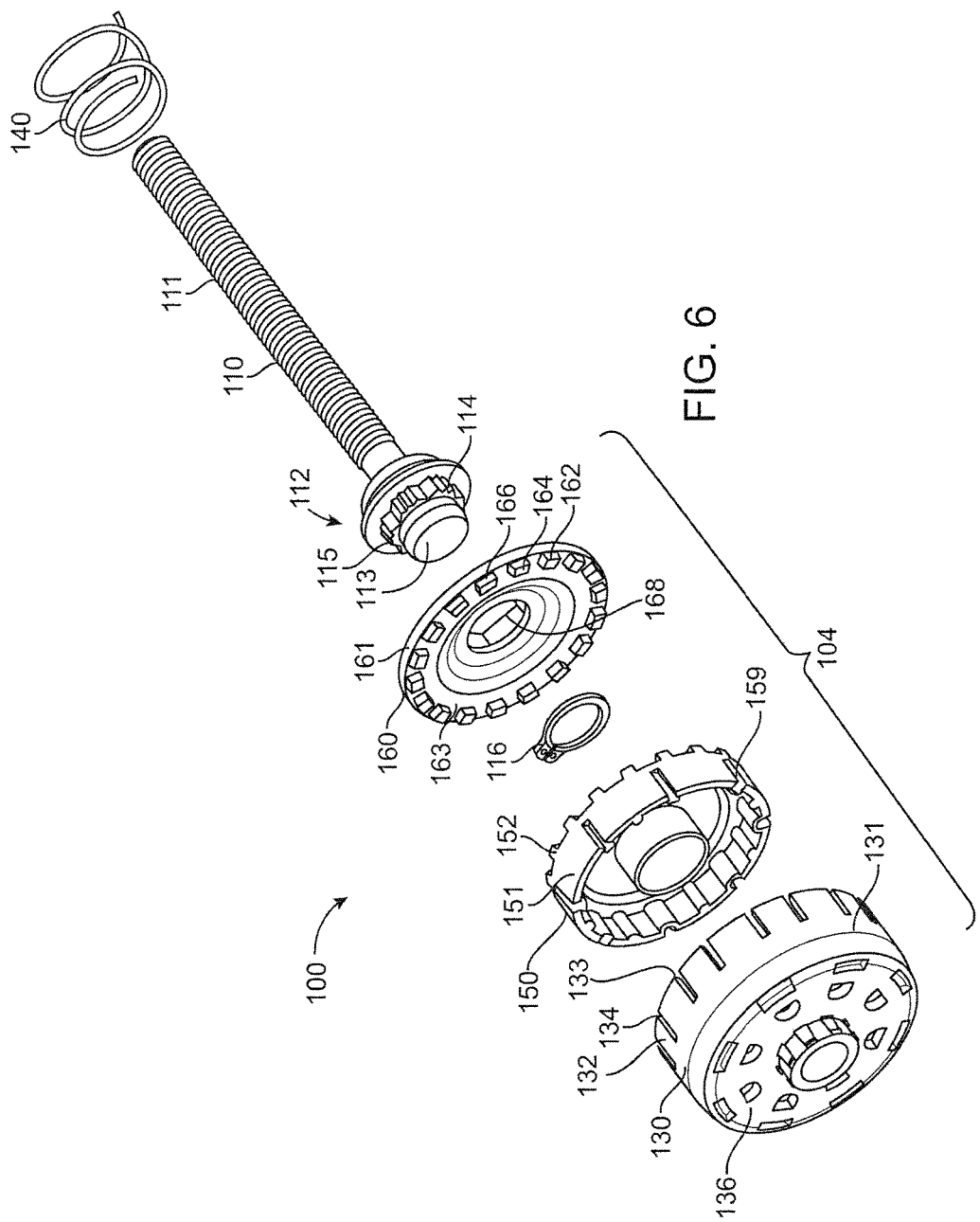
FIG. 6 is an exploded perspective view of the drive mechanism, in accordance with an exemplary embodiment, according to FIG. 5.

FIG. 6 illustrates an exploded view of the drive mechanism 100 according to an exemplarily embodiment. As illustrated, the drive mechanism includes a transmission 102 which includes a slip mechanism 104. The slip mechanism 104 can include at least a pair of opposed ramped surfaces biased toward one another and that remain substantially stationary relative to one another in face-to-face engagement when drive forces less than the predetermined drive-force are transmitted to the skewer 70. The predetermined drive-force can be a force determined to assure that a pinch-secured bicycle fork remains secured to the bicycle fork anchor until intentionally released. Additionally, the slip mechanism 104 can include at least a pair of opposed ramped surfaces biased toward one another and that slide past one another across face-to-face engagement when drive-forces greater than the predetermined drive-force are attempted to be transmitted to the skewer 70. The predetermined drive-force can be a force above which squeeze-damage to the prong of the bicycle fork is risked. The predetermined drive-force can be based on the worst case scenario drag calculation for a bike along with an appropriate safety factor. In at least one embodiment, the safety factor is five times. In other embodiments, the safety factor is between two and eight times. In at least one configuration, the slip mechanism can be described as a torque transmission limiter in that the torque being transmitted by the drive shaft is limited by the configuration of the pair of opposed ramped surfaces.

In the illustrated embodiment of FIG. 6, the slip mechanism 104 includes a pair of disc shaped members (150, 160). Each of the disc shaped members can have at least one ramped surface configured to engage the at least one ramped surface of the other disc shaped member. In at least one embodiment, the at least one ramped surface can include a plurality of ramped surfaces. In at least one embodiment, the at least one ramped surface can be a tooth. As illustrated, a plurality of teeth is present on each of the disc shaped members. As illustrated the plurality of teeth can be substantially located on the perimeter of each of the respective one of the pair of disc shaped members. The teeth as illustrated can be of a cuboid shape. In other embodiments, the teeth can have other shapes such as cubic, pyramidal, conical, and prismatic. The shape of the teeth can be chosen based upon the size of the force that is to be transferred. In other embodiments, the shape of the teeth is based upon the molding technique used to construct the teeth. In other embodiments, the shape of the teeth is based upon the machining technique used to construct the teeth.

Additionally, a drive shaft 110 is illustrated in FIG. 6. The drive shaft 110 has a head portion 114 which is configured for mating engagement with one of the disc members 160 of the slip mechanism 104. The head portion 114 can have a shape which allows for synchronized rotational motion with the one disc member 160. The one disc member 160 has an aperture 168 formed therethrough. The aperture 168 can have a portion that is configured to receive and rotationally couple with the head portion 114 of the drive shaft 110. The head 114 of the drive shaft 110 can have a hexagonal shape, for example. The aperture 168 can have a shape that is configured to receive the hexagonal shape. Additionally, end portion 113 of the head 114 of the drive shaft 110 can extend through the aperture 168 such that it protrudes. The head 114 of the drive shaft 110 can also include a groove 115 that is configured to receive a locking ring 116 that prevents motion of the drive shaft 110 in an axial direction relative to the one disc member 160. The locking ring 116 can be another type of locking device that prevents the motion of the drive shaft 110 in an axial direction relative to the one disc member 160. In other embodiments, a fastener can couple the drive shaft 110 to the one disc member 160 to prevent relative axial movement. In yet other embodiments, the one disc member 160 can be bonded to the drive shaft 110. Thus, the drive shaft 110 in one or more embodiments can be described as being coupled to the slip mechanism 104, which in the illustrated embodiment includes the one disc member 160. Therefore, when the slip mechanism (which can include the pair of disc shaped member 150, 160) is coupled to the drive shaft 110, one of members of the slip mechanism (for example, one of the pair of disc shaped members) can be constrained to rotary motion with the drive shaft. Additionally, in at least one embodiment, the one of the disc shaped member 160 includes a drive shaft fixing aperture (for example aperture 168). The drive shaft fixing aperture constrains the drive shaft 110 from non-synchronized rotation relative to the one disc shaped member 160. In at least one embodiment, an axial restraint (for example, the locking ring 116) can be configured to axially restrain the movement of the drive shaft 110 relative to the one disc shaped member 160.

The drive shaft 110 can further include a biasing member engagement portion 112. The biasing member engagement portion 112 can be configured to receive the biasing force from the biasing member 140. In other embodiments, the biasing member 140 can act on the one disc member 160. When the biasing member 140 acts on the one disc member 160, the one disc member 160 can have a biasing member engagement portion. The biasing member engagement portion of the disc member 160 or drive shaft 110 can be configured based on the shape of the biasing member 140. Additionally the biasing member engagement portion can be reinforced to bear the direct loading from the biasing member 140.

Figure 7:
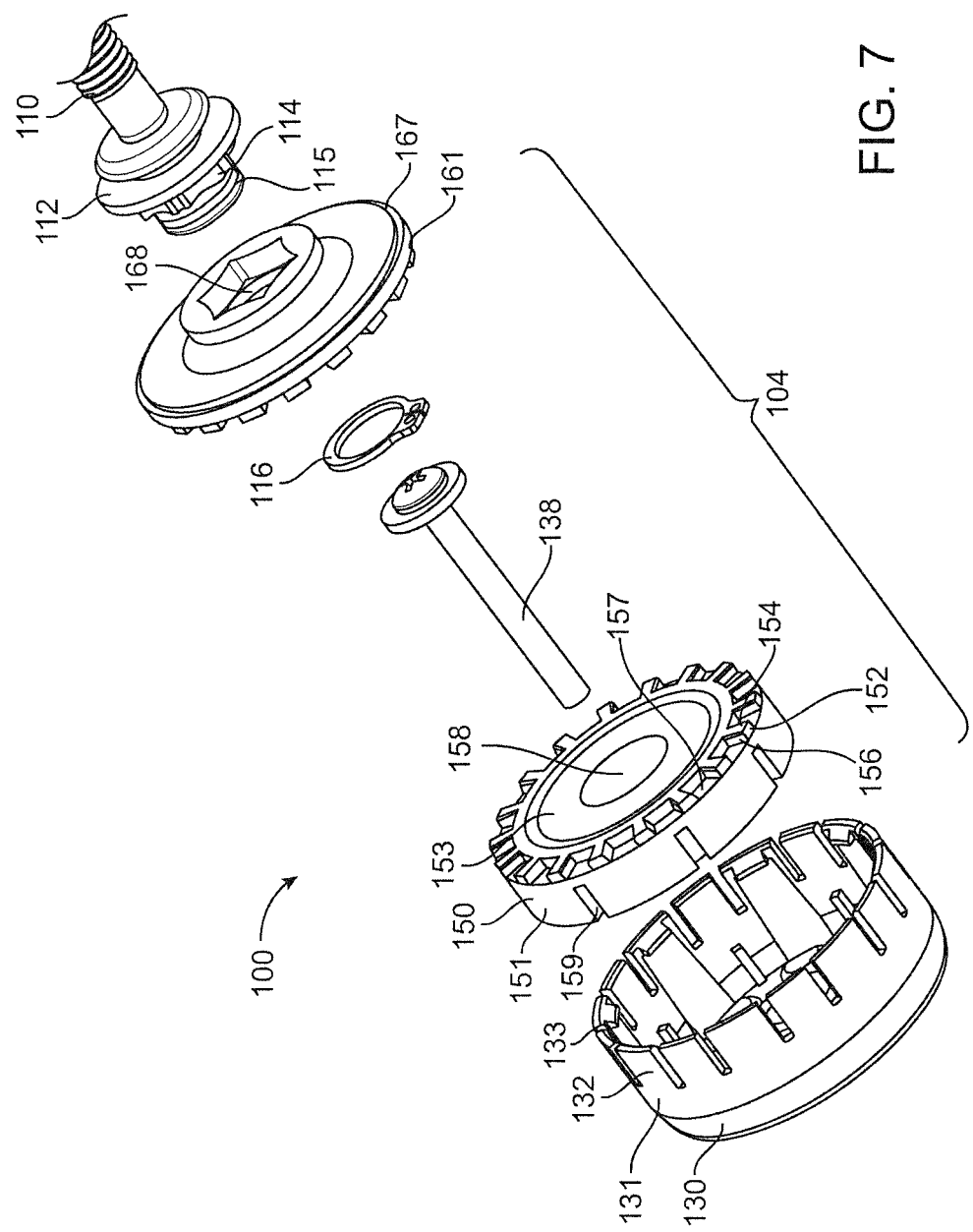
FIG. 7 is an exploded perspective view of the drive mechanism, in accordance with an exemplary embodiment, according to FIG. 5 from a different angle than the one shown in FIG. 6.

In order to more fully explain the interaction between the pair of disc members (150, 160) and the retaining member 130, reference will be made to both FIGS. 6 and 7, which show different perspective exploded views of an exemplarily embodiment of the slip mechanism 104 and the interaction with the drive shaft 110 and retaining member 130. As illustrated in FIG. 6, the one disc member 160 has a nominal face surface 163. The nominal face surface 163 can substantially flat. The nominal face surface 163 refers to the surface of the one disc member 160 without considering the teeth 162 or any recesses formed therein. The another disc member 150 has a nominal face surface 153. (See FIG. 7). The teeth 152 of the another disc member 150 are formed such that a top surface 154 can be substantially flush with the nominal face surface 153. The sides 156 of the teeth 152 extend inwardly in an axial direction from the nominal face surface 153, wherein a recess 157 between adjacent teeth top surfaces 154 can be formed. This recess 157 accommodates the teeth 162 of the one disc member 160. The recess 157 can be sized such that the recess 157 is larger than the teeth 162. Thus, the recess 157 includes additional space.

The plurality of teeth of the one disc member 160 can have side faces 166, which are substantially perpendicular to the nominal face surface 163. Additionally, the plurality of teeth on the another disc member 150 can have side faces 156 that are substantially perpendicular to the nominal face surface 153 (see FIG. 7). As illustrated, the teeth are cuboid, but could be other shapes. In some of the other shapes as described above, the side faces 156, 166 would not be perpendicular. Furthermore, it is possible that while one set of side faces 156, 166 are perpendicular to the respective nominal face surface 153, 163, the other set of side faces 156, 166 could not be perpendicular. For example, it could be advantageous for the side faces of to have different shapes for allowing or preventing slippage.

The one disc member 160 can have a perimeter 161. As illustrated the teeth 162 are formed such that a portion of the teeth is adjacent to the perimeter 161 of the one disc member 160. Similarly, the another disc member 150 can have a perimeter 151. The teeth 152 of the another disc member 150 can be fon led such that a portion of the teeth 152 form the perimeter 151 of the another disc member 150. In other embodiments, the teeth (152, 162) of the both the one disc member 160 and another disc member 150 can be configured such that are radially inward from the perimeter (151, 161) of the respective disc member (150, 160). The configuration of teeth (152, 162) can be such that they slip relative to one another once a predetermined force has been exceeded.

The another disc 150 can have grooves 159 formed in the perimeter 151 thereof. The grooves 159 can provide for gap space between the retaining member 130 and the another member 150. The grooves 159 can provide for easier relative rotation of the another disc member 150 relative to the retaining member 130.

An aperture 158 is formed through the nominal face surface 153. The aperture 158 is configured to receive a fastener 138. The fastener 138 is configured to couple the another disc member 150 to the manually operable actuator (not shown). The fastener 138 can also secure the retaining member 130 to manually operable actuator. In at least one embodiment, the fastener 138 does not secure the another disc member 150, but only secures the retaining member 130. Thus, the another disc member 150 can be rotated independently of the retaining member 130 and the manually operable actuator. When the retaining member 130 and another disc member 150 are secured to the manually operable actuator, the retaining member 130 and another disc member 150 rotate substantially together with the manually operable actuator. In another embodiment, the retaining member 130 can be integrally formed or bonded to the manually operable actuator. In yet another embodiment, the another disc member 150 can be integrally formed with the manually operable actuator. Thus, in at least one embodiment, the manually operable actuator can be rotatably constrained to the retaining member 130. And when the slip mechanism includes a pair of disc shaped members (150, 160), the manually operable actuator can be further constrained on one of the pair of disc shaped members (150, 160), for example the another member 160.

Figure 8:
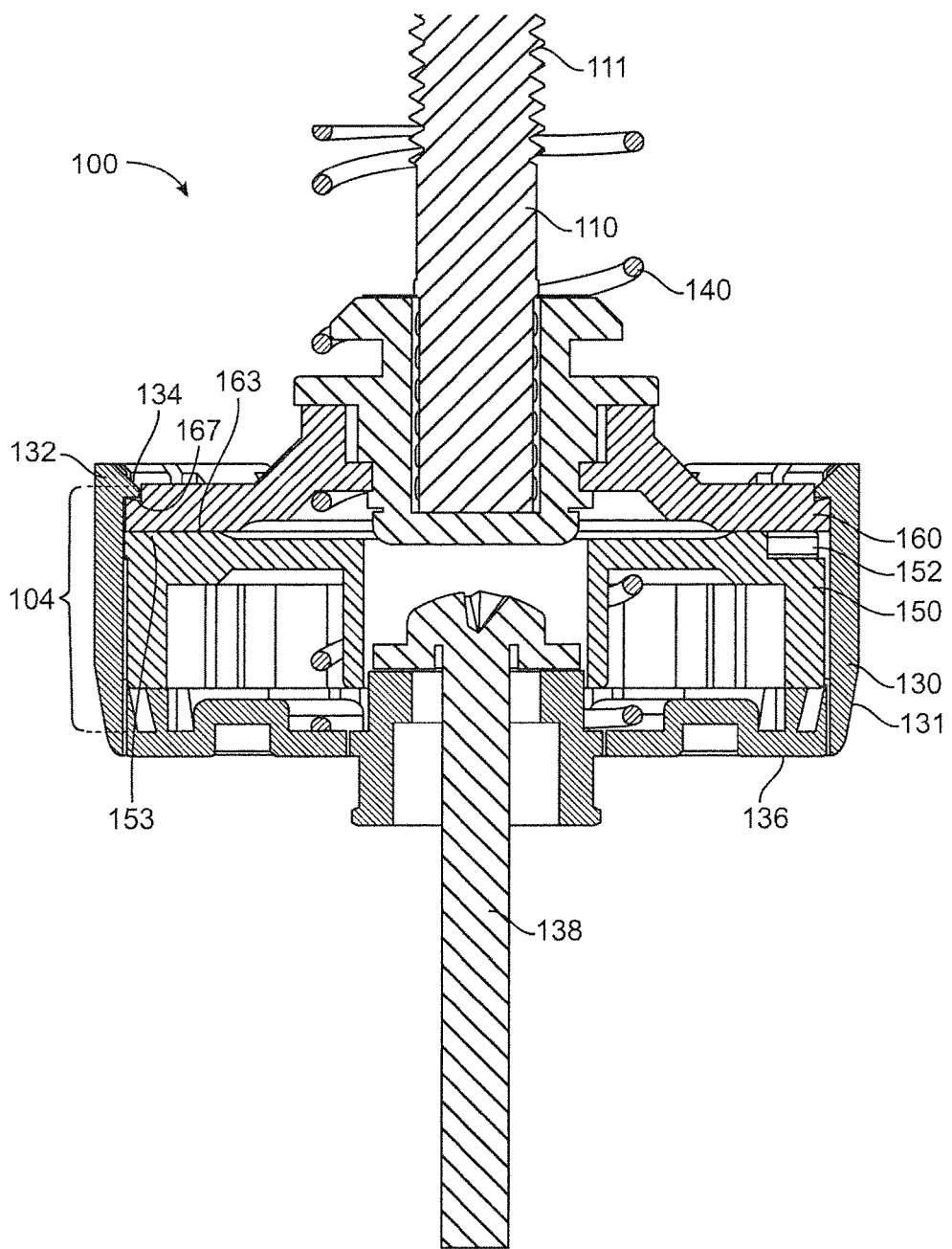
FIG. 8 is a section view of the drive mechanism, in accordance with an exemplary embodiment.

FIG. 8 illustrates an exemplary cross-sectional view of the drive mechanism 100 according to the present disclosure. As illustrated from the top moving downwards, the drive mechanism 100 includes a drive shaft 110, a biasing member 140, one disc member 160, another disc member 150, a retaining member 130 and a fastener 138. As indicated above, other configurations can be implemented. As seen in the illustration, the drive shaft 110 includes a threaded portion 111. The threaded portion can be configured to be coupled to a skewer adjustment mechanism (not shown). The drive shaft 110 can be configured to be rotationally coupled to the one disc member 160 so that when the one disc member 160 rotates the drive shaft 110 in turn rotates. The one disc member 160 can be coupled to the another disc member 150 by coupling of teeth 162 and teeth 152 of the respective disc member 160, 150. The one disc member 160 and another disc member can be said to form a slip mechanism 104. The slip mechanism 104 can include other components in addition to the one disc member 160 and another disc member 150.

Additionally, the drive mechanism 100 can include a retaining member 130. The retaining member 130 can be configured to retain the slip mechanism 104. As illustrated in FIG. 8, when the slip mechanism includes a pair of disc shaped members 160, 150, the retaining member 130 can be substantially cylindrical in shape. The retaining member 130 can include a bottom surface 136 and a plurality of tabs 132 can make up the side face 131 of the retaining member 130 in addition to some recesses (not shown) formed between the tabs 132. Additionally, retention tabs 134 can be included. The retention tabs 134 can extend radially inward from tabs 132. The retention tabs 134 in conjunction with bottom 136 constrain the movement of the slip mechanism 104 in the axial direction. In the illustrated example, the one disc member 160 includes a retention groove 167 formed around the perimeter of the one disc member 160. Thus, the retention groove can be described as receiving a portion of the plurality of retention tabs. The retention tabs 134 thus constrain the axial movement of the one disc member 160. Additionally, the retention tabs 134 allow for each of the pair of disc shaped members 160, 150 to be inserted and removed from the retaining member 130. This configuration allows for replacement of the disc shaped members 160, 150 due to wear or damage. Furthermore, a single retaining member 130 can be made that accommodates different disc shaped members 160, 150 which can then allow for different levels of predetermined force to be transmitted. Additionally, the biasing member 140 can be changed out depending upon the desired force to be transmitted.

As seen in FIG. 8, the biasing member 140 biases the slip mechanism 104 an engaged configuration. In at least one embodiment, when the slip mechanism 104 includes a pair of disc shaped members 160, 150, the biasing member 140 can bias one of the pair of disc shaped members 160, 150 towards another one of the pair of disc shaped members 160, 150. In yet another embodiment, another biasing member can be included and the another biasing member can bias another of the pair of disc shaped members 160, 150 toward the one of the of the pair of disc shaped members 160, 150.

When pair of disc shaped members 160, 150 are in an engaged configuration, the nominal face surfaces 163, 153 substantially abut one another. In other embodiments, the nominal face surfaces 163, 153 of the pair of disc shaped members 160,150 can be parallel and separated by a distance which is less than a height of the plurality of teeth.

Figure 9:
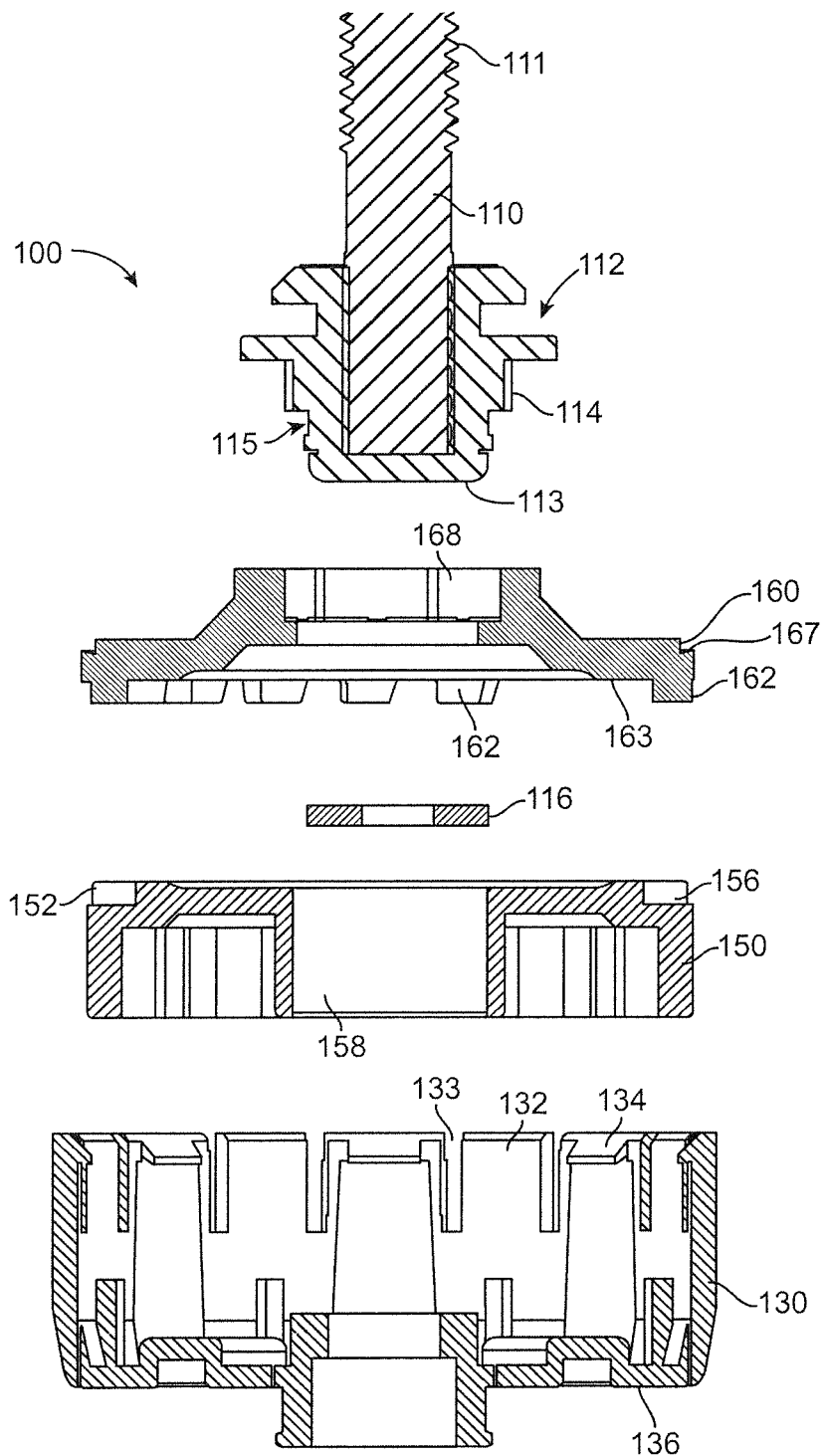
FIG. 9 is an exploded section view of the drive mechanism, in accordance with an exemplary embodiment.

FIG. 9 is an exploded cross-section view of drive mechanism 100 of FIG. 8, wherein the biasing member 140 has been omitted for clarity. The drive shaft 110 is located at the top of the drawing. The drive shaft 110 includes a threaded portion 111, a head portion 114, a groove 115, an end portion 113, and a biasing member engagement portion 112. The head portion 114 of the drive shaft 110 can be received in an aperture 168 of the one disc member 160. The one disc member 160 can include a retention groove 167 that is formed around the perimeter 161 of the one disc shaped member 160. As indicated above, the retention groove can be configured to be retained by retention tab 134.

A plurality of teeth 162 extend from the nominal face surface 163 of the one member 160. The plurality of teeth 162 are configured for mating engagement with teeth 152 of the another member 150. As indicated above the plurality of teeth 162, 152 can be configured to transmit up to a predetermined amount of force before slipping relative to one another. The sides 156 of the teeth 152 extend inwardly in an axial direction from the nominal face surface 153.

A retaining member 130 is also illustrated. As illustrated, the retaining member 130 includes a plurality of tabs 132 forming the side of retaining member 130. Some of the plurality of tabs 132 also include a retention tab 134. In the illustrated example, a retention tab is on every other tab 132. In other embodiments, each of the tabs 132 can include a retention tab 134. In other embodiments, the retention tab 134 can only be on every third tab 132. While in still other embodiments only three retention tabs 134 can be provided. Between the tabs 132, a gap space can be formed to allow the tabs 132 to have flexibility. The retaining member 130 includes a bottom 136 that constrains the pair of disc shaped members 160, 150.

Figure 10:
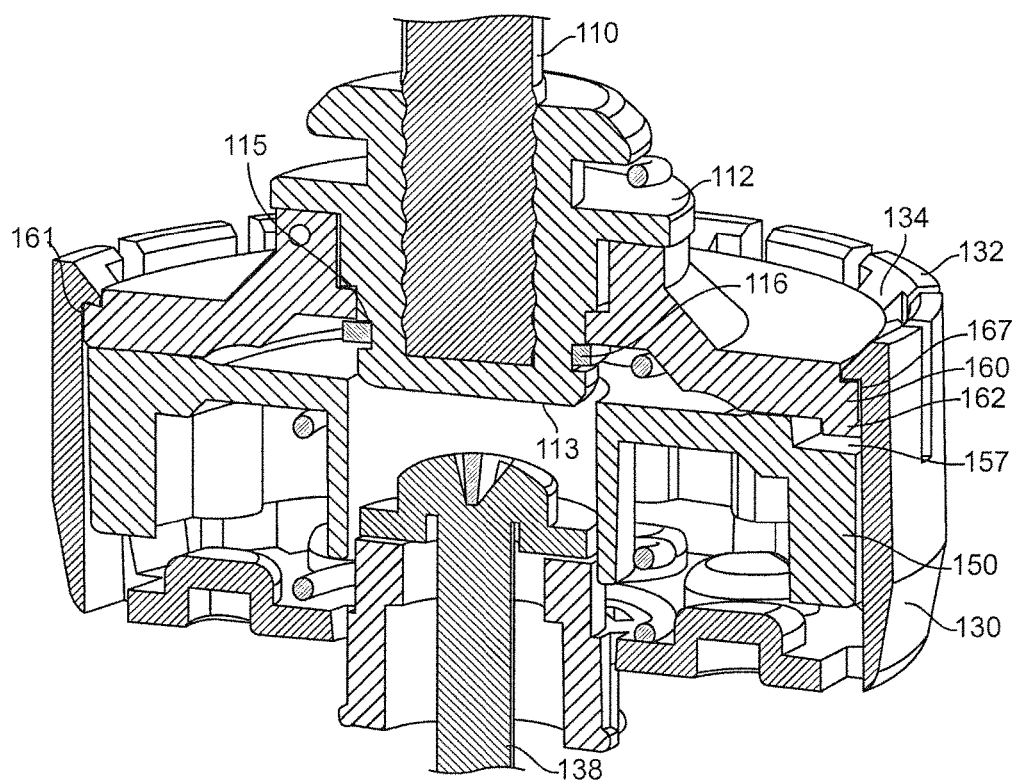
FIG. 10 is a perspective section view of the drive mechanism, in accordance with an exemplary embodiment.

FIG. 10 illustrates a perspective cross-section view of the drive member 100. The drive shaft 110 is located at the top of the drawing. The drive shaft 110 includes a head portion 114, a groove 115, an end portion 113, and a biasing member engagement portion 112. The head portion 114 of the drive shaft 110 can be received in an aperture 168 of the one disc member 160. The one disc member 160 can include a retention groove 167 that is formed around the perimeter 161 of the one disc shaped member 160. As indicated above, the retention groove can be configured to be retained by retention tab 134.

A recess 157 between adjacent teeth top surfaces (not shown) can be formed. This recess 157 accommodates the teeth 162 of the one disc member 160. The recess 157 can be sized such that the recess 157 is larger than the teeth 162.

A retaining member 130 is also illustrated. As illustrated, the retaining member 130 includes a plurality of tabs 132 forming the side of retaining member 130. Some of the plurality of tabs 132 also include a retention tab 134. In the illustrated example, a retention tab is on every other tab 132. In other embodiments, each of the tabs 132 can include a retention tab 134. In other embodiments, the retention tab 134 can only be on every third tab 132. While in still other embodiments only three retention tabs 134 can be provided. Between the tabs 132, a gap space can be formed to allow the tabs 132 to have flexibility. The retaining member 130 includes a bottom 136 that constrains the pair of disc shaped members 160, 150.

While reference in the foregoing paragraphs has consistently labeled one of the disc members as one of the disc members 160 and the other as another disc member 150, the claims may use the terms for different ones of the pair of disc members (150, 160) due to claim drafting requirements. Furthermore, the disclosure has described certain features as being a part of one of the disc members, but not necessarily the other. These examples are not intended to imply that the features must be on only one of the disc members and not the other. However, when disc members are included as a part of the slip mechanism, the features of the respective disc member should allow for slipping of one of the disc members relative to the other once a predetermined force is exceed, thus the slip mechanism only transfers force below a predetermined force.

Example implementations have been described hereinabove regarding various example embodiments. The example embodiments are intended to constitute non-limiting examples. The subject matter that is intended to be within this disclosure is set forth in the following claims.

The invention claimed is:

1. A drive mechanism for a bicycle carrier, the drive mechanism comprising:
  a manually operable actuator coupled to a transmission comprising a slip mechanism connected to a drive shaft; and
  a retaining member configured to retain the slip mechanism,
  wherein the retaining member is cylindrical in shape and the slip mechanism comprises a pair of disc shaped members,
  wherein the retaining member includes a bottom face and a side face comprising a plurality of tabs,
  wherein a plurality of retention tabs extend radially inward from at least some of the plurality of tabs, and
  wherein one of the disc shaped members has a retention groove formed around the perimeter, the retention groove configured to receive a portion of the plurality of retention tabs.

2. The drive mechanism as recited in claim 1, wherein the slip mechanism comprises at least a pair of opposed ramped surfaces biased toward one another and that remain stationary relative to one another in face-to-face engagement when drive-forces less than a predetermined drive-force are transmitted.

3. The drive mechanism as recited in claim 1, wherein the slip mechanism comprises at least a pair of opposed ramped surfaces biased toward one another and that slide past one another across face-to-face engagement when drive-forces greater than a predetermined drive-force are attempted to be transmitted.

4. The drive mechanism as recited in claim 1, wherein the manually operable actuator comprises an operator graspable, rotary nose-cone positioned at a front of the bicycle carrier.

5. The drive mechanism as recited in claim 1, wherein the slip mechanism is a torque transmission limiter.

6. The drive mechanism as recited in claim 1, wherein each of the disc shaped members have at least one ramped surface configured to engage the at least one ramped surface of the other disc shaped member.

7. The drive mechanism as recited in claim 6, wherein the at least one ramped surface comprises a plurality of ramped surfaces.

8. The drive mechanism as recited in claim 6, wherein the at least one ramped surface is a tooth.

9. The drive mechanism as recited in claim 6, wherein the at least one ramped surface is a plurality of teeth.

10. The drive mechanism as recited in claim 9, wherein the plurality of teeth are located on the perimeter of the pair of disc shaped members.

11. The drive mechanism as recited in claim 9, wherein the plurality of teeth are cuboid in shape.

12. The drive mechanism as recited in claim 9, wherein the plurality of teeth are configured such that they are configured to fit one inside each other and include an additional space.

13. The drive mechanism as recited in claim 9, wherein the pair of disc shaped members have a nominal face surface, the teeth on one of the pair of disc shaped members having a face surface which is flush to the nominal face surface of the one of the pair of disc shaped members, the teeth on another of the pair of disc shaped members having a face surface which is parallel but beyond the nominal face surface of the another of the pair of disc shaped members.

14. The drive mechanism as recited in claim 13, wherein in an engaged configuration the nominal face surfaces of the pair of disc shaped members abut one another.

15. The drive mechanism as recited in claim 13, wherein in an engaged configuration the nominal face surfaces of the pair of disc shaped members are parallel and separated by a distance which is less than a height of the plurality of teeth.

16. The drive mechanism as recited in claim 13, wherein the plurality of teeth on the one of the pair of disc shaped members have side faces which are perpendicular to the nominal face surface.

17. The drive mechanism as recited in claim 13, wherein the plurality of teeth on the another of the pair of disc shaped members have side faces which are perpendicular to the nominal face surface.

18. The drive mechanism as recited in claim 1, further comprising a biasing member which biases the slip mechanism to an engaged configuration.

19. The drive mechanism as recited in claim 18, wherein the biasing member is a spring.

20. The drive mechanism as recited in claim 18, wherein the biasing member biases one of the pair of discs towards another one of the pair of discs.

21. The drive mechanism as recited in claim 20, further comprising another biasing member, wherein the another biasing member biases the another of the pair of discs towards the one of the pair of discs.

22. The drive mechanism as recited in claim 1, wherein the drive shaft is constrained to rotatory movement with one of the pair of disc shaped members.

23. The drive mechanism as recited in claim 22, wherein the one of the disc shaped members comprises a drive shaft fixing aperture, wherein the drive shaft fixing aperture constrains the drive shaft from non-synchronized rotation relative to the one disc shaped member.

24. The drive mechanism as recited in claim 23, further comprising an axial restraint configured to axially restrain the movement of the drive shaft relative to the one disc shaped member.

25. The drive mechanism as recited in claim 1, wherein the drive shaft is threaded.

26. A bicycle carrier configured for receiving a wheel of a bicycle, the bicycle carrier comprising:

a main tube;
a wheel tray for receiving the wheel of the bicycle, the wheel tray coupled to the main tube; and
a drive mechanism for the bicycle carrier, the drive mechanism comprising:
  a manually operable actuator coupled to a transmission comprising a slip mechanism connected to a drive shaft; and
  a retaining member configured to retain the slip mechanism,
  wherein the retaining member is cylindrical in shape and the slip mechanism comprises a pair of disc shaped members,
  wherein the retaining member includes a bottom face and a side face comprising a plurality of tabs,
  wherein a plurality of retention tabs extend radially inward from at least some of the plurality of tabs, and
  wherein one of the disc shaped members has a retention groove formed around the perimeter, the retention groove configured to receive a portion of the plurality of retention tabs.

27. The bicycle carrier as recited in claim 26, wherein the manually operable actuator is rotatably constrained to the retaining member.

28. The bicycle carrier as recited in claim 27, wherein the manually operable actuator is further constrained to one of the pair of disc shaped members.

* * * * *